United States Patent [19]
Wolf

[11] Patent Number: 5,919,568
[45] Date of Patent: Jul. 6, 1999

[54] POWDER COATING AND ITS USE FOR COATING HEAT-RESISTANT SUBSTRATES

[75] Inventor: Elmar Wolf, Recklinghausen, Germany

[73] Assignee: Huels Aktiengesellschaft, Marl, Germany

[21] Appl. No.: 08/764,442

[22] Filed: Dec. 12, 1996

[30] Foreign Application Priority Data

Dec. 18, 1995 [DE] Germany .................. 195 47 205

[51] Int. Cl.⁶ .................. B32B 27/38; B32B 27/40; C08G 18/00
[52] U.S. Cl. ............ 428/413; 428/423.1; 524/590; 524/904; 525/127; 525/131; 525/453; 525/457; 525/459; 525/460; 528/44; 528/59; 528/60; 528/61
[58] Field of Search .................. 428/480, 413, 428/423.1; 528/44, 45, 59, 60, 67, 66, 61, 65; 524/590, 904; 525/123, 127, 130, 131, 453, 457, 459, 460

[56] References Cited

U.S. PATENT DOCUMENTS

| | | | |
|---|---|---|---|
| 4,093,674 | 6/1978 | Tsutsui et al. | 260/830 P |
| 4,150,211 | 4/1979 | Muller et al. | 528/45 |
| 4,288,586 | 9/1981 | Bock et al. | 528/67 |
| 4,900,800 | 2/1990 | Halpaap et al. | 528/66 |
| 5,510,444 | 4/1996 | Halpaap et al. | 528/45 |
| 5,541,279 | 7/1996 | Gras et al. | 528/45 |
| 5,552,487 | 9/1996 | Clark et al. | 525/131 |
| 5,646,228 | 7/1997 | Gras et al. | 528/45 |

FOREIGN PATENT DOCUMENTS

| | | |
|---|---|---|
| 0 254 152 | 1/1988 | European Pat. Off. . |
| 0 652 263 | 5/1995 | European Pat. Off. . |
| 0 669 351 | 8/1995 | European Pat. Off. . |
| 0 669 353 | 8/1995 | European Pat. Off. . |
| 9 201 868 | 5/1994 | Netherlands . |
| 92-01868 | 5/1994 | Netherlands . |

*Primary Examiner*—Vivian Chen
*Attorney, Agent, or Firm*—Oblon, Spivak, McClelland, Maier & Neustadt, P.C.

[57] ABSTRACT

A power coating and a substrate coated with the coating are provided, wherein the coating contains a mixture of A) a pulverulent polyisocyanate component which is a solid at temperatures of less than 50° C. and a liquid at temperatures above 160° C., of the formula I

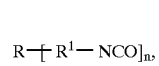

(I)

where R, R¹ and n are as described herein, and

B) a pulverulent, organic polyhydroxy component which is a solid at temperatures of less than 50° C. and a liquid at temperatures above 160° C. and having a ratio of secondary to primary OH groups of at least 3.1, wherein components A and B are present in a ratio of equivalents of NCO:OH groups of from 0.5:1 to 1.3:1, and wherein component B is selected from the group consisting of bisphenol A-containing epoxy resin, oligoamides containing secondary hydroxyl groups, and mixtures thereof.

13 Claims, No Drawings

POWDER COATING AND ITS USE FOR COATING HEAT-RESISTANT SUBSTRATES

BACKGROUND OF THE INVENTION

1. Field of the Invention

The present invention relates to a new powder coating based on a combination of one or more organic polyhydroxy compounds with one or more organic polyisocyanates as crosslinking agents and to the use of this powder coating in the preparation of a coating on any heat-resistant substrate.

2. Discussion of the Background

Heat-curable powder compositions obtained by reacting a hydroxyl-containing resin with a masked polyisocyanate are known and enjoy widespread use. Among the masked polyisocyanates, ε-caprolactam-blocked isophorone diisocyanate adducts have become established as PU powder hardeners. The PU powders produced with these hardeners are taking up a prominent market position as a result of their superior weathering stability and thermal color stability.

For instance DE-A 21 05 777 disclosed ε-caprolactam-blocked adducts of isophorone diisocyanate (IPDI for short) and diols and/or triols as hardeners for PU powders, providing a range of advantages.

DE-A 25 42 191 teaches blocked polyisocyanates of IPDI, ε-caprolactam and a polyol which is a mixture of a diol and triol, and their use for the preparation (in combination with a hydroxyl-containing polymer) of heat-curable pulverulent coating compositions.

DE-A 27 35 497 (U.S. Pat. No. 4,246,308) describes pulverulent PU coating materials comprising hydroxyl-containing polyesters, polyacrylates or epoxy resins, wherein the polyisocyanate component used for ε-caprolactam blocking comprises the isocyanatoisocyanurate and, if desired, oligomers together with monomeric IPDI.

In DE-A 27 07 656 (U.S. Pat. No. 4,150,211) a binder combination is disclosed that is similar to that in DE-A 27 35 497, the hardener component used being a partially trimerized IPDI/hexamethylene diisocyanate/toluenediisocyanate mixture whose free NCO groups are blocked with ε-caprolactam.

DE-A 30 04 876 discloses blocked polyisocyanates consisting of ε-caprolactam-blocked adducts of IPDI and polyols, the adducts containing 3.3–8 NCO equivalents per OH equivalent. PU powder coatings are produced with these blocked IPDI adducts.

DE-A 31 43 060 describes PU powders in which the hardener component comprises reaction products obtained by chain extension of IPDI with an aliphatic diamine and subsequent ε-caprolactam blocking.

With suitable hydroxy compounds, these ε-caprolactam-blocked IPDI derivatives give rise on stoving, to coating materials which couple ease of handling with the features of good levelling, high hardness and elasticity and good chemical resistance. A disadvantage of these PU powder coatings, however, is the high stoving temperature, which is about 180–200° C. A further disadvantage of these PU powder coatings is to be seen in the removal of the ε-caprolactam, which, during the processing of the powder coatings, makes it absolutely necessary to take special measures to clean the waste air and to recover the blocking agent.

There has been no shortage of effort expended to reduce the high stoving temperatures by choosing other blocking agents. For example, oximes (DE-A 22 00 342, EP-A 0 432 257, U.S. Pat. No. 3,857,818), triazoles (DE-A 28 12 252), cyclic amidines (DE-A 27 44 721) and secondary amines (DE-A 34 34 881) have all been proposed as blocking agents with relatively low deblocking temperatures for PU powder coating hardeners.

The fundamental disadvantage, however, namely the content of blocking agents in the powder coating, has not been overcome.

This fundamental disadvantage of the content of blocking agents in the powder coating has been eliminated by using linear IPDI derivatives which are free from blocking agent, contain uretdione groups and urethane groups and also have, at the end, urethane groups, urea groups or free NCO groups (EP-A 0 045 994, EP-A 0 045 996 or EP-A 0 045 998). Unfortunately, the preparation of the hardener is a complex process requiring complex technology.

The same applies to the PU powder coatings of DE-A 36 24 775, in which the hardener component used comprises polyisocyanates which are solid below 40° C. and liquid above 150° C. and contain no blocking agents for isocyanate groups.

SUMMARY OF THE PRESENT INVENTION

Accordingly, one object of the present invention is to provide a PU powder coating which is free from blocking agent and does not have the disadvantages of the prior art.

A further object of the present invention is to provide a coated substrate having a coating made from the PU powder coating of the present invention.

These and other objects of the present invention have been satisfied by the discovery of a powder coating and a substrate coated with the coating, wherein the coating comprises a mixture of A) a pulverulent polyisocyanate component which is a solid at temperatures of less than 50° C. and a liquid at temperatures above 160° C., of the formula I

where R, $R^1$ and n are as described herein, and

B) a pulverulent, organic polyhydroxy component which is a solid at temperatures of less than 50° C. and a liquid at temperatures above 160° C. and having a ratio of secondary to primary OH groups of at least 3:1, wherein components A and B are present in a ratio of equivalents of NCO:OH groups of from 0.5:1 to 1.3:1.

DETAILED DESCRIPTION OF THE PREFERRED EMBODIMENTS

The present invention relates to a powder coating comprising a mixture of

A) a pulverulent polyisocyanate component which is a solid at temperatures of less than 50° C. and a liquid at temperatures above 160° C., of the formula I

in which R is a) 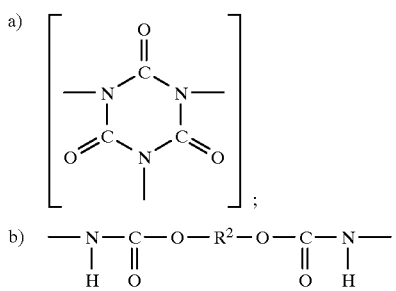

b) 
$$-\text{N}-\text{C}-\text{O}-\text{R}^2-\text{O}-\text{C}-\text{N}-$$
$$\phantom{-}\text{H}\phantom{-}\text{O}\phantom{-----}\text{O}\phantom{-}\text{H}$$

where $R^2$ is $C_2$–$C_{12}$-(cyclo)alkylene;

c) 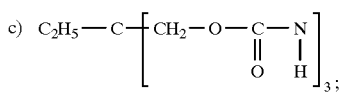

or d) 
$$-\text{N}-\text{C}-\text{N}-\text{R}^2-\text{N}-\text{C}-\text{N}-$$
$$\phantom{-}\text{H}\phantom{-}\text{O}\phantom{-}\text{X}\phantom{----}\text{X}\phantom{-}\text{O}\phantom{-}\text{H}$$

where X is H and/or $C_1$–$C_{12}$-(cyclo)alkyl;

$R^1$ is 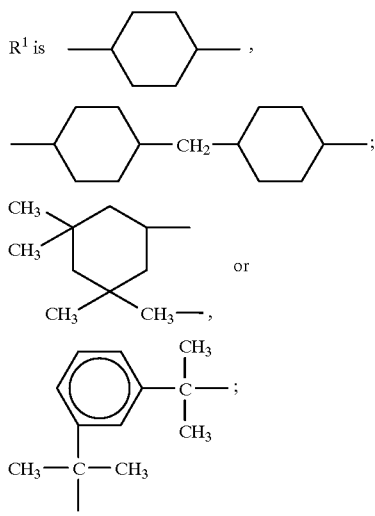

and n is 2–5,

B) a pulverulent, organic polyhydroxy component which is a solid at temperatures of less than 50° C. and a liquid at temperatures above 160° C. and having a ratio of secondary to primary OH groups of at least 3:1, wherein components A and B are present in a ratio of equivalents of NCO to OH groups of from 0.5:1 to 1.3:1.

The present invention also provides for the use of this powder coating for the production of coatings and bonds of any desired heat-resistant substrates using conventional powder coating technology.

Suitable starting compounds for the preparation of component A of the present coating composition include, but are not limited to, the following diisocyanates: isophorone diisocyanate (IPDI), bis(4-isocyanatocyclohexyl)methane ($H_{12}$MDI), α,α,α',α'-tetramethyl-m-xylylene diisocyanate (m-TMXDI) and cyclohexane 1,4-diisocyanate (CHDI). The diisocyanate is subjected to molecular enlargement as achieved by trimerization or by reaction with substoichiometric quantities of one or more polyols or diamines.

Molecular enlargement by trimerization has proven expedient in the case of IPDI and $H_{12}$MDI. In this case, the diisocyanates are reacted to the extent of about 40% at 80° C. with 0.2–0.4% of a quaternary ammonium salt. The unreacted diisocyanate is then removed from the reaction product by thin-film distillations These isocyanato-containing polyisocyanates are preferably used with polyols B having a low OH functionality.

Molecular enlargement with one or more polyols can be readily applied equally to all of the above-mentioned diisocyanates. In this context the diisocyanate is heated with a polyol in an NCO:OH equivalents ratio of (1.5–2):1, preferably 2:1, in the malt at 80–150° C. until one NCO equivalent has been consumed per OH equivalent. Suitable polyols for the chain extension of the above-mentioned diisocyanates are, in principle, all low molecular weight diols and triols, with ethylene glycol, butanediol, hexanediol, decanediol, dodecanediol, neopentylglycol, 1,4-dimethylolcyclohexane, 1,1,1-trimethylolpropane and 1,2,6-hexanetriol being preferred.

In the case of molecular enlargement with diamines, the diamine is added in portions to the diisocyanate, which is heated at 180° C. The diamine is added at a rate such that the temperature does not exceed 220° C. Heating is then continued at 220° C. until the intermediate precipitate has dissolved. Once the precipitate dissolves, the mixture is cooled to room temperature. Suitable diamines are, in principle, all primary and secondary diamines of low molecular weight; with 2,2,4(2,4,4)-trimethyl-hexamethylenediamine, 2-methylpentamethylenediamine, N,N'-dihexylisophoronediamine, N-isopropylisophoronediamine and H-cyclohexylpropane-1,3-diamine being preferred.

The polyols B to be used for the present coating material include polymers containing secondary OH groups, such as bisphenol A-based epoxy (EP) resins:

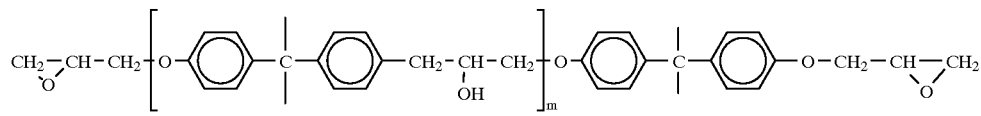

where m is 2–10.

These EP resins are preferably used in combination with the solid polyisocyanate A to produce metal bonds.

Further suitable hydroxyl-containing compounds useful as polyols with secondary OH groups (component B) include polyesters which comprise, as essential components, incorporated by condensation, the following acids/esters/anhydrides and alcohols:

1. cyclic polycarboxylic acids and esters or anhydrides thereof, such as phthalic acid, isophthalic acid, terephthalic acid, trimellitic anhydride, and dimethyl terephthalate and acyclic polycarboxylic acids and esters or anhydrides thereof, such as adipic acid, 2,2,4(2,4,4)-trimethyladipic acid and dodecanedioic acid, and
2. polyols, such as ethylene glycol, 1,2-propanediol, 1,3-butanediol, 2,2dimethylpropanediol, 4,4'-dihydroxydicyclohexyl-2,2-propane, 1,4-cyclohexanediol and trimethylolpropane.

The polyesters are prepared using conventional esterification or transesterification procedures, in the presence or absence of customary catalysts. The end products are obtained by an appropriate choice of the COOH-OH ratio to give a hydroxyl number of from 25 to 250, preferably from 40 to 150.

The softening temperatures of the polyesters must be sufficiently low to allow processing at temperatures between 70 and 120° C., along with the additives necessary for the preparation of the coating compositions according to the invention. On the other hand, the softening points must be high enough for the resulting coating materials of the present invention to be ground to form non-caking, free-flowing powders with a particle size of from about 20 to about 120 μm.

A simple method for the preparation of polyesters having secondary OH groups consists in the transesterification of polyesters containing primary OH groups with methyl lactate.

In a further method for the preparation of polymers having secondary OH groups, oligoamides having terminal $NH_2$ groups are reacted with methyl lactate at 120–150° C., with the elimination of methanol. The basic oligoamides are prepared in a known manner by condensation of aliphatic dicarboxylic acids or their esters, such as adipic acid, 2,2,4(2,4,4)trimethyladipic acid, sebacic acid, decanedicarboxylic acid or dodecanedicarboxylic acid and (cyclo) aliphatic primary diamines, such as hexamethylenediamine, 2,4,4(2,2,4)-trimethylhexamethylenediamine, isophoronediamine, 4,4'-diaminodicyclohexylmethane, 3,3'-dimethyl-4,4'-diaminodicyclohexylmethane or dodecanediamine. The molecular weight of the basic oligoamides is from 300 to 3000, preferably 1000 to 2000, as established by the molar ratio of diamine to dicarboxylic acid.

Examples of optional auxiliaries and additives which can be used include pigments, such as titanium dioxide, and levelling agents, such as polybutyl acrylate, or those based on polysilicones. In order to prepare the ready-to-use powder coating which can simultaneously be used as a pulverulent one-component adhesive, the polyisocyanate component A and the polyhydroxy component B are mixed with one another, the additives C are added, if desired, and the mixture is mixed thoroughly to form a homogeneous material. The thorough mixing can be performed using conventional methods, preferably in an extruder or a kneading apparatus, at temperatures above the melting range of the individual components, such as 80–120° C. The solid which results after the melt has cooled is subsequently ground and is freed from particle fractions above 100 μm by sieving. All that must be done to prepare the ready-to-use powder coating from the starting materials is then brief heating to temperatures above the melting range of the individual components. No notable reaction takes place between components A and B. If this were to be the case, it would be evident in severe levelling defects of the cured powder coating.

The application of the thus-prepared powder coating to the substrates can take place in accordance with customary powder application techniques, such as electrostatic powder spraying or fluidized-bed sintering. Curing of the coatings is effected by heating at temperatures of 150 to 180° C., preferably 160° C., for a period of 10–30 minutes, preferably 15–20 minutes. Hard, glossy and elastic coatings are obtained which have outstanding anticorrosion properties and very good thermal color stability.

The metal bonds produced with the powder coating according to the invention have high lap shear strengths (DIN 53 283) both at room temperature and at elevated temperatures.

Having generally described this invention, a further understanding can be obtained by reference to certain specific examples which are provided herein for purposes of illustration only and are not intended to be limiting unless otherwise specified.

EXAMPLES

I. Preparation of the NCO Component 1. 1000 parts by weight of IPDI were heated to 80° C. 2 parts by weight of Dabco® TMR (from Air Products) were added to the IDPI under intense stirring. The temperature rose to 125° C. After this temperature maximum had been reached, the reaction was complete. The NCO content of the reaction mixture was 30.5%.

In a 2nd step, the unreacted IPDI was separated from the reaction product in a thin-film evaporator at 180° C./0.1 mbar. The reaction product had an NCO content of 17.2% and an IPDI content of 0.5%. The melting range was 92–96° C. The mean NCO functionality was about 3.4.

2. 144 parts by weight of 1,4-bis(hydroxymethyl) cyclohexane (cyclohexane-1,4-dimethanol, CHDM) were added at 100° C. to 444 parts by weight of IPDI. After the end of the addition of CHDM, heating at 100° C. was continued until the NCO content of the reaction mixture was 14.1%.

The reaction product had a melting range of 52–62° C. and a monomer content of 5.3%. The NCO functionality was 2.

II. Preparation of the OH Component

1. Starting materials:

8.75 mol of dimethyl terephthalate 1.0 mol of dimethyl adipate 3.25 mol of terephthalic acid 13.25 mol of 1,2-propanediol 0.75 mol of trimethylolpropane Conventional methods were used to prepare, from these starting materials, a polyester having the following characteristics:

| Physical data: | |
| --- | --- |
| OH number: | 48 mg of KOH/g |
| Acid number: | 6 mg of KOH/g |
| Methyl ester end groups: | 0.4 mg of KOH/g |
| Melting range: | 84–90° C. |
| Glass transition temp. (DTA): | 55–62/57° C. |
| Molar ratio: sec. OH: prim. OH (determined by NMR): | 4.1:1 |

2. Polyol containing epoxide groups (II.2)

In the Use Examples, the polyol component (II.2) was a hydroxyl-containing epoxy (EP) resin from Shell. The EP resin is characterized by the following characteristics according to the manufacturer.

| EP equivalent weight: | 875–975 |
|---|---|
| OH equivalent weight: | about 300 |
| Melting point [° C.]: | 96–104 |

3. Polyol containing epoxide groups (II.3)

In the Use Examples, the polyol component (II.3) was a further EP resin from Shell. This EP resin is characterized by the following characteristics according to the manufacturer.

| EP equivalent weight: | 450–500 |
|---|---|
| OH equivalent weight: | about 310 |
| Melting point [° C.] | 64–74 |

III. Reactivity Comparison of Polyols Containing Primary and Secondary OH Groups with Polyisocyanates A good indication of the reactivity of a resin/hardener mixture is obtained by kneading the mixture in a kneading chamber at temperatures of 100–120° C. and monitoring the resistance to kneading as a function of time. The viscosity, and therefore the resistance to kneading, increases progressively with the reactions. If crosslinking occurs, this is associated with a sharp rise in the resistance to kneading, although this immediately falls again sharply (almost to zero). The crosslinked product is ground up finely and presents almost no further resistance to the kneading apparatus.

TABLE 1

Kneading behavior of polyols and polyisocyanates in the Brabender plastograph

| | Polyol | Polyiso-cyanate | OH: - NCO | Duration of kneading [min] until crosslinking at 100° C. | 120° C. |
|---|---|---|---|---|---|
| a) | *Alftalat AN 739 (hydroxy ester with primary OH groups) | I.1 | 1:1 | crosslinks on introduction | — |
| b) | Alftalat AN 739 | I.2 | 1:1 | 1 | — |
| c) | II.2 | I.1 | 1:1 | 32 | 13 |
| d) | II.2 | I.2 | 1:1 | 35 | 17 |

*Polyester from Hoechst; OH number; 56–60 mg of KOH/g; this polyester is used in combination with blocked IPDI adducts in the preparation of PU powders.

IV. Preparation of Powder Coatings 49.6 parts by weight of the hydroxyl-containing polyester II.1, 10.4 parts by weight of the polyisocyanate prepared in accordance with Example I.1 and 40 parts by weight of white pigments TiO$_2$, (KRONOS RN 57 P®) were intimately combined in a solids mixer and the mixture was then extruded at a mixture temperature of 95–100° C. The solidified melt was ground to a particle size of <100 µm. The resulting powder coating was applied electrostatically to 1 mm steel test panels.

The coatings were stoved under various curing conditions and, after 24 h, were subjected to coatings performance testing.

TABLE 2

| Stoving conditions time/temp. min./° C. | | CT | HK | HB | EI | CH | Impact reverse | GG 60° ≮ |
|---|---|---|---|---|---|---|---|---|
| 30 | 180 | 60–70 | 195 | 111 | >10 | 0 | >944.6 | 89 |
| 20 | 180 | 65–80 | 193 | 111 | >10 | 0 | >944.6 | 88 |
| 30 | 160 | 50–60 | 188 | 125 | >10 | 0 | >944.6 | 91 |
| 20 | 160 | 60–70 | 192 | 111 | 5.6–7.1 | 0 | 115.2 | 92 |

The abbreviations in the table have the following meanings:
CT = Coat thickness in µm
HK = König pendulum attenuation in sec (DIN 53 157)
HB = Bucholz hardness (DIN 53 153)
El = Erichsen indentation in mm (DIN 53 156)
CH = Cross-hatch test (DIN 53 151)
GG 60° ≮ = Gardner gloss measurement (ASTM-D 523)
Imp. rev. = Impact reverse in g · m V. Metal Bonds with the Powder Coating According to the Present Invention The OH-containing component B was mixed intensively with the polyisocyanate A in an OH-NCO ratio of 2:1 and 1:1 and the mixture was extruded at 100° C., finely ground and applied, by sieving, to the steel panels (1.5 mm thick) to be bonded. The steel panels had been cleaned with Scotch Brite prior to application of the powder coating and prior to the conclusion of bonding, the steel panels were fixed with screw clamps. Curing was performed at 180° C. The lap shear strengths of these steel panels bonded in accordance with DIN 53 283 are listed in the table below (see Table 3).

TABLE 3

| | Composition of the pulverulent one-component adhesive | | | | St/St LSS N/mm$^2$ (DIN 53 283) | |
|---|---|---|---|---|---|---|
| Example No. | Hardener | Resin | Mixing ratio NCO:OH | Curing | Room temperature | 80° C. |
| 1 | I.1 | II.2 | 1:1 | | 12 | 13 |
| 2 | I.1 | II.2 | 1:2 | | 16 | 14 |
| 3 | I.2 | II.2 | 1:1 | ↑ | 11 | 11 |
| 4 | I.2 | II.2 | 1:2 | 30 min | 19 | 15 |
| 5 | I.1 | II.3 | 1:1 | at | 16 | 16 |
| 6 | I.1 | II.3 | 1:2 | 180° C. | 11 | 10 |
| 7 | I.2 | II.3 | 1:1 | ↓ | 18 | 16 |
| 8 | I.2 | II.3 | 1:2 | | 10 | 11 |

St: steel
LSS: lap shear strength.

This application is based on German Patent Application 195 47 205.5, filed with the German Patent Office on Dec. 18, 1995, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A powder coating comprising:

A) a pulverulent polyisocyanate component which is a solid at temperatures of less than 50° C. and a liquid at temperatures above 160° C., of the formula I

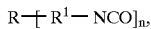

wherein R is a) 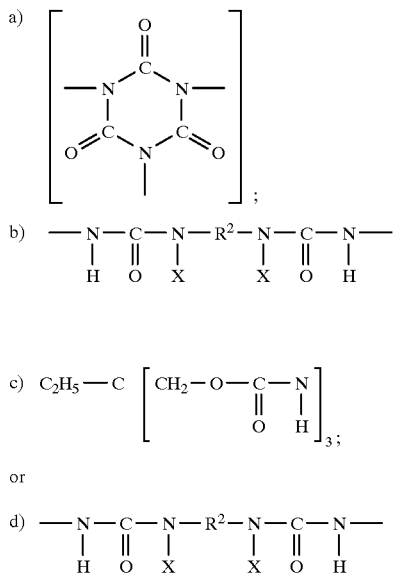

where X is H and/or $C_1$–$C_{12}$-(cyclo)alkyl;

$R^1$ is 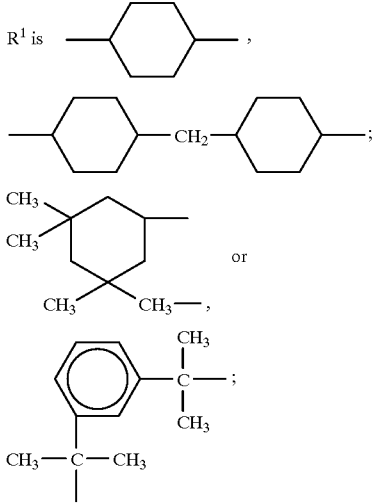

and n is 2–5, and

B) a pulverulent, organic polyhydroxy component which is a solid at temperatures of less than 50° C. and a liquid at temperatures above 160° C. and having a ratio of secondary to primary OH groups of at least 3:1, wherein components A and B are present in a ratio of equivalents of NCO:OH groups of from 0.5:1 to 1.3:1, and wherein component B is selected from the group consisting of bisphenol A-containing epoxy resin, oligoamides containing secondary hydroxyl groups, and mixtures thereof.

2. The powder coating as claimed in claim 1, further comprising one or more conventional powder coating additives or auxiliaries.

3. The powder coating as claimed in claim 1, wherein component A is a diisocyanate selected from the group consisting of isophorone diisocyanate (IPDI), bis(4-isocyanatocyclohexyl)methane ($H_{12}$MDI), α,α,α',α'-tetramethyl-m-xylylene diisocyanate (m-TMXDI) and cyclohexane-1,4-diisocyanate (CHDI).

4. The powder coating as claimed in claim 3, wherein diisocyanate A is chain-extended.

5. The powder coating as claimed in claim 4, wherein said chain extension is effected by trimerization or with a substoichiometric quantity of one or more polyols or one or more diamines with respect to the -NCO groups present in the diisocyanate A.

6. The powder coating as claimed in claim 5, wherein said one or more polyols are selected from the group consisting of ethylene glycol, butanediol, hexanediol, decanediol, dodecanediol, neopentylglycol, 1,4-dimethylolcyclohexane, 1,1,1-trimethylolpropane and 1,2,6-hexanetriol.

7. The powder coating as claimed in claim 5, wherein said one or more diamines are selected from the group consisting of 2,2,4(2,4,4)-trimethylhexamethylene diamine, 2-methylpentamethylenediamine, N,N'-dihexylisophoronediamine, N-isopropylisophoronediamine and H-cyclohexylpropane-1,3-diamine.

8. The powder coating according to claim 1, wherein said mixture is a homogenous material.

9. The powder coating as claimed in claim 1, wherein said oligoamides have a molecular weight of 300–3,000.

10. A coated substrate comprising:
a heat-resistant substrate having thereon a powder coating, wherein the powder coating comprises:
a mixture of
A) a pulverulent polyisocyanate component which is a solid at temperatures of less than 50° C. and a liquid at temperatures above 160° C., of the formula I

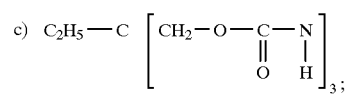

wherein R is a) 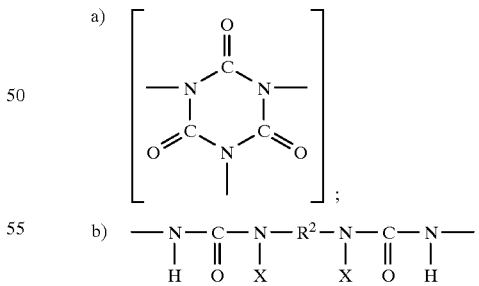

where $R^2$ is $C_2$–$C_{12}$-(cyclo)alkylene;

c) 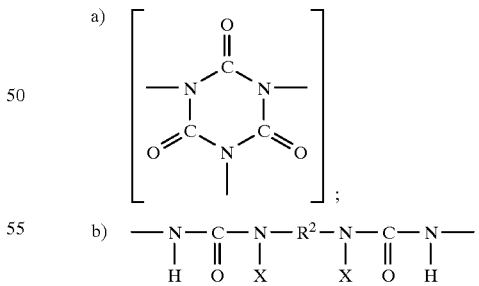

or

-continued d) 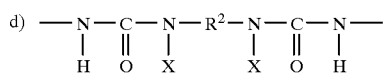

where X is H and/or $C_1$–$C_{12}$-(cyclo)alkyl;

$R^1$ is 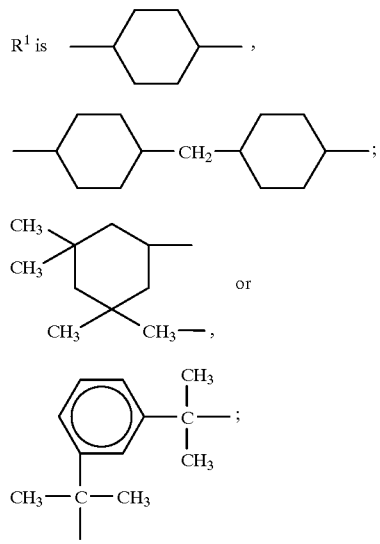

and n is 2–5, and

B) a pulverulent, organic polyhydroxy component which is a solid at temperatures of less than 50° C. and a liquid at temperatures above 160° C. and having a ratio of secondary to primary OH groups of at least 3:1, wherein components A and B are present in a ratio of equivalents of NCO:OH groups of from 0.5:1 to 1.3:1, and wherein component B is selected from the group consisting of bisphenol A-containing epoxy resin, oligoamides containing secondary hydroxyl groups, and mixtures thereof.

11. The coated substrate according to claim 10, wherein component A is a diisocyanate selected from the group consisting of isophorone diisocyanate (IPDI), bis(4-isocyanatocyclohexyl)methane ($H_{12}$MDI), α,α,α',α'-tetramethyl-m-xylylene diisocyanate (m-THXDI) and cyclohexane-1,4-diisocyanate (CHDI).

12. The coated substrate according to claim 10, wherein diisocyanate A is chain-extended.

13. The coated substrates according to claim 10, wherein said oligoamides have a molecular weight of 300–3,000.

* * * * *